May 14, 1957  C. H. KIDWELL ET AL  2,792,114
CLASSIFYING AND TREATING METHOD AND APPARATUS
Filed Feb. 3, 1953  5 Sheets-Sheet 1

INVENTORS.
CLEO HAROLD KIDWELL &
ARTHUR OSCHWALD, JR.
BY
their ATTORNEYS.

INVENTORS.
CLEO HAROLD KIDWELL &
ARTHUR OSCHWALD, JR.
BY
their ATTORNEYS.

May 14, 1957  C. H. KIDWELL ET AL  2,792,114
CLASSIFYING AND TREATING METHOD AND APPARATUS
Filed Feb. 3, 1953  5 Sheets-Sheet 3
FIG.6.
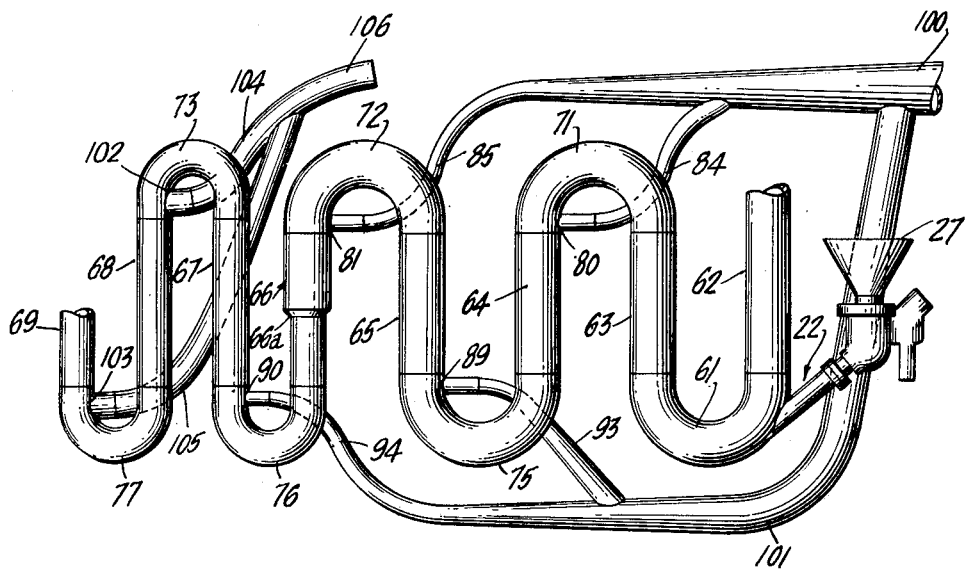
FIG.11
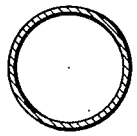
FIG.12.
FIG.13.
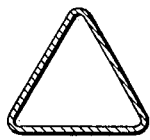
FIG.14.
INVENTORS.
CLEO HAROLD KIDWELL &
ARTHUR OSCHWALD, JR.
BY
Campbell, Brumbaugh, Free & Graves
their ATTORNEYS.

May 14, 1957 C. H. KIDWELL ET AL 2,792,114
CLASSIFYING AND TREATING METHOD AND APPARATUS
Filed Feb. 3, 1953 5 Sheets-Sheet 5
FIG.15a.
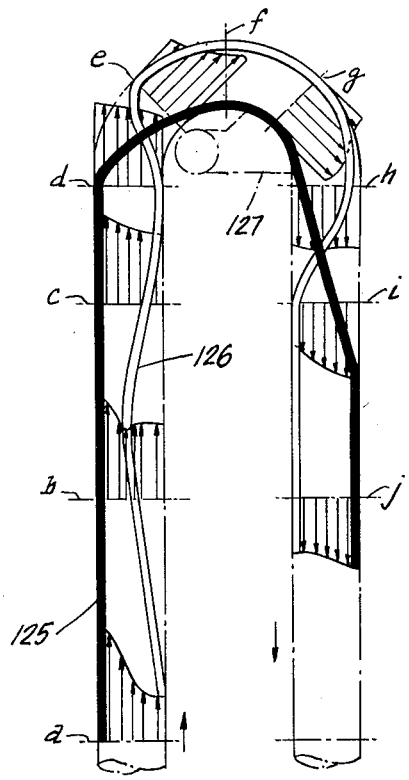
FIG.15.
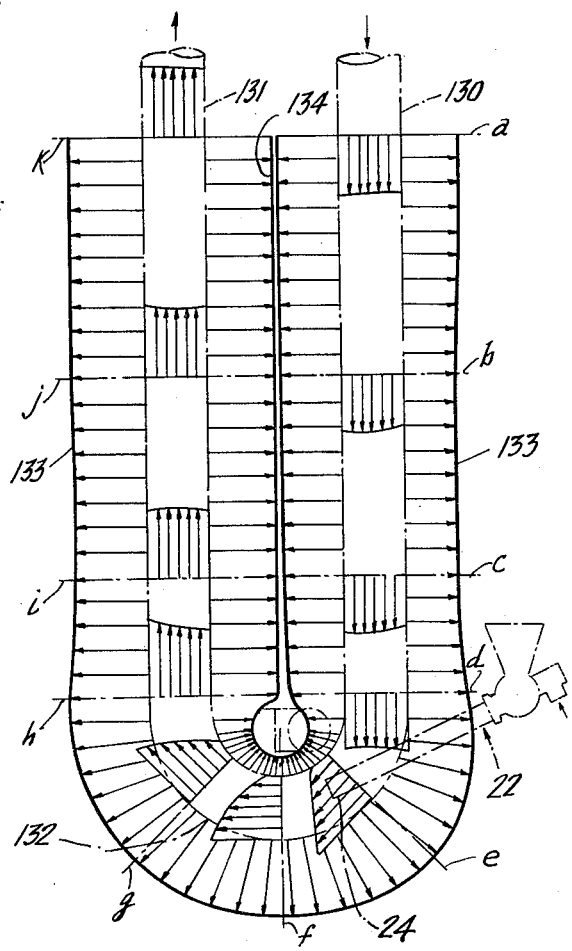
FIG.16.
INVENTORS.
CLEO HAROLD KIDWELL
& ARTHUR OSCHWALD, JR.
BY
their ATTORNEYS.

United States Patent Office 2,792,114
Patented May 14, 1957

2,792,114

CLASSIFYING AND TREATING METHOD AND APPARATUS

Cleo Harold Kidwell and Arthur Oschwald, Jr., Short Hills, N. J., assignors to Reduction Engineering Corporation, Newark, N. J., a corporation of New Jersey Application February 3, 1953, Serial No. 334,882

13 Claims. (Cl. 209—139)

This invention relates to methods and apparatus for classifying and treating materials.

Methods and apparatus have been developed heretofore for treating and classifying solid materials using suspending fluids such as compressed air, superheated steam and the like, and depending in most cases upon a principle which is essentially similar to that employed in conventional cyclone collectors. For the most part classification has not been completely effective. Small percentages of oversize particles tend to appear among the classified matter with the result that the exacting standards of modern industry are not met. For example, poorly classified material used in synthetic fibers impairs the tensile strength; in paints, films and coatings the finishes are impaired.

Moreover, some classifying techniques used heretofore tend to use large quantities of suspending fluids under high pressure in an attempt to carry out the desired result. The result is a lower production rate and a higher power cost.

It is therefore one object of the present invention to provide an improved apparatus and method for classifying and treating materials.

Another object of the invention is to provide improved classifying apparatus and methods whereby more accurately controlled micron particle size is achieved in selected ranges.

Another object of the invention is to provide apparatus and methods for classifying and treating materials which result in low power costs.

Another object of the invention is to provide classifying apparatus and methods whereby unclassified material may be introduced continuously and finished products continuously withdrawn which are classified within exceptionally sharp boundaries over a range of micron sizes.

Still another object of the invention is to provide classifying apparatus whereby preestablished velocities may be maintained throughout the mechanism while simultaneously removing in separate stages some of the fluid in which the material to be classified is entrained.

These and other objects and features of the invention may be attained, for example, by means of a system including a tubular conduit affording both straight and curved flow paths for a fluid in which a material to be treated or classified is entrained. Injection of the unclassified or untreated solid material into the system may be carried out through an input system, the discharge end of which is predisposed with respect to the pattern of fluid flow to encounter an area of relatively low static pressure and also to utilize the pattern of the flow effectively to cause the material to become suspended in the fluid. Successive conduit portions are arranged to afford alternately straight and curved flow paths to control the relationship between the fluid and the unclassified material entrained therein. Outlet means may be provided in the vicinity of preestablished curves in the flow path, preferably adjacent areas of high velocity, for receiving a portion of the fluid and that portion of the solid material viscously entrained thereby. The cross-sectional areas and shapes of the conduits and outlets may be changed between the ends of the system to maintain and establish desired flow velocities. In this fashion one degree of classification may be maintained or, alternatively, many degrees of classification may be achieved in a single system. In the latter case each subsequent point of withdrawal may be arranged to provide either smaller or larger particle sizes, as required.

The invention may be better understood by reference to the following specification taken in conjunction with the accompanying drawings illustrating several preferred embodiments of the invention, and in which:

Figure 6 is a side view of a form of classifying apparatus formed in accordance with the invention whereby more than two classifications of a product may be obtained simultaneously;

Figures 11 through 14 inclusive are views in transverse section of representative conduits which may be used in apparatus formed in accordance with the present invention;

Figure 15 is a composite graph showing velocity profiles of a suspending fluid taken at spaced points along a given section of a classifying apparatus formed in accordance with the invention and also showing curves of the maximum and minimum velocities throughout the section;

Figure 15a is a single graph of the velocity profile taken along the line identified by the letter $f$ in Figure 15;

Figure 16 is a composite graph showing static pressure profiles taken at spaced points in the input section of a classifying apparatus, showing curves of static pressures along the inner and outer walls, and showing a preferred arrangement for injecting matter into the system.

Figure 1:
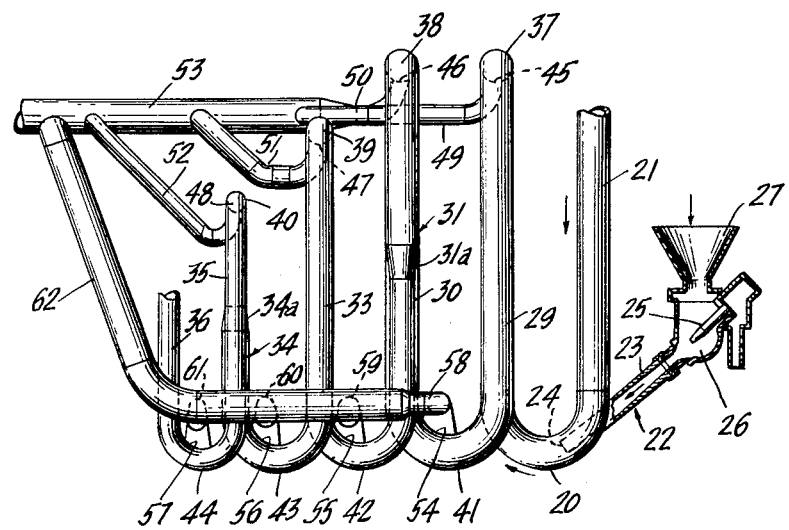
Figure 1 is a side view of one form of classifying apparatus for carrying out the present invention.
Figure 2:
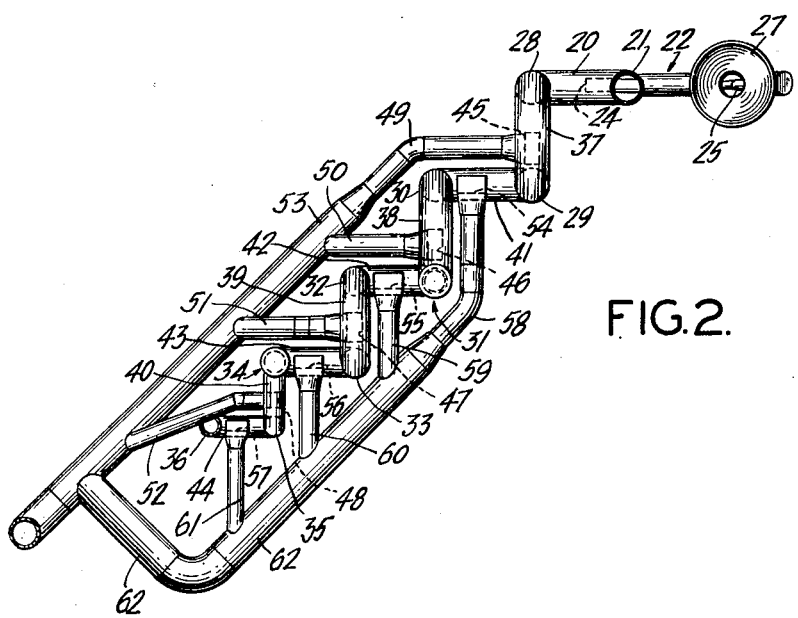
Figure 2 is a plan view of the apparatus of Figure 1.

Referring to Figures 1 and 2, the invention is illustrated as embodied in a classifying apparatus having an input in the form of a curved conduit portion 20 into which fluids may be introduced from sources which may include a fluid conduit 21 adapted to be connected to a suitable pump (not shown) and an injection conduit 22 inclined with respect to the axis of the conduit 21 and piercing the curved conduit portion 20 between its ends. Solid particles to be classified are preferably entrained in the fluid introduced by the injection conduit 22.

To this end the injection conduit 22 may be in the form of a venturi 23, the discharge end 24 of which is disposed within the curved conduit portion 20 at a location which is preferably relatively close to the innermost curved surface thereof and favoring the upstream extremity. The preferred spatial relationship between the surfaces of the curved conduit portion 20 and the discharge end 24 of the venturi 23 will be described more precisely below having reference to the graphs of Figures 15 and 16.

Fluid is introduced into the venturi 23 by means of an injection nozzle 25 received within a chamber 26 having a hopper 27 mounted at its upper end through which material to be classified and/or treated may be introduced into the chamber 26 to be entrained in the fluid jet which passes through the venturi 23 into the curved conduit portion 20.

The fluids from the conduits 21 and 22 meeting within the conduit portion 20 fully entrain and suspend the material which is introduced from the hopper 27 and cause the material to be conveyed clockwise through the conduit portion 20. Emerging from the conduit portion 20 the fluid and entrained material pass through a series of conduit portions including a plurality of straight conduit portions 28, 29, 30, 31, 32, 33, 34, 35 and 36, joined at their upper ends by a plurality of curved conduit portions 37, 38, 39 and 40 (disposed in planes normal to the paper as viewed in Figure 1) and joined at their lower ends by a plurality of curved conduit sections 41, 42, 43 and 44 (disposed in planes parallel to the paper as viewed in Figure 1), thereby to form a single, tortuous path for the fluids and solid materials entrained therein.

Communicating with the inner surfaces (radially speaking) of the upper curved conduit portions 37, 38, 39 and 40 are outlets 45, 46, 47 and 48 respectively, connected by means of ducts 49, 50, 51 and 52 to a common exhaust or discharge manifold 53 which may in turn discharge into a collection chamber (not shown).

Communicating with the inner surfaces of the lower curved conduit portions 41, 42, 43 and 44 are outlets 54, 55, 56 and 57, respectively, connected by means of ducts 58, 59, 60 and 61 to a common exhaust or discharge manifold 62, which may empty into the manifold 53.

A portion of the fluid passing through the upper curved conduit portion 37 will discharge into the outlet 45 carrying with it due to viscous drag some of the particles of solid material. The particles thus collected will be part of the fine cut of the entire classification.

The balance of the fluid and entrained material not discharged at the outlet 45 will travel successively through the alternately straight and curved conduit portions. As fluid and entrained material approach and pass successive outlets, additional fluid and material will escape via the outlets. Further separating means substantially identical to that described above may be connected to receive the fluid and entrained material which remains after passing through the last straight conduit portion 36, or a coarse product may be extracted from the conduit 36.

In the classification apparatus as described above, the fine material issuing from each of the outlets is led into a common manifold and collected together as a total composite. This is made possible because the material issuing from each outlet is substantially of the same particle size as that issuing from the other outlets, this uniform classification of material being obtained by means of decreases in the cross-sectional area of the conduit in the direction of flow. To this end constricting sections 31a and 34a may be provided in the conduit portions 31 and 34, respectively. Of course additional constricting sections may be provided approaching a condition wherein there is a constant diminution in cross-sectional area throughout the length of the apparatus. This arrangement maintains the fluid and entrained material at substantially the same velocity throughout its passage through the curved and straight portions.

Also in accordance with the invention the area of the successive outlets may be progressively decreased, as shown, in direct proportion to the decrease in cross-sectional area of the conduits. In this fashion the flow velocity through the various outlets is substantially the same and uniform particle sizes will result.

In cases where only two final products are desired, namely fine and coarse, a preferred form of fabrication is a continuous and progressive, gradual reduction in cross-sectional area of the tubular classifier and correspondingly proportional decreases in the areas of the outlets, although as a practical matter such construction is not readily attainable and highly satisfactory results are attained by means of the simplified system illustrated by Figures 1 and 2 wherein the fine product will be extracted through the manifolds 53 and 62 and the coarse product through the conduit 36.

In the embodiment of the invention as disclosed in Figures 1 and 2, successive curved conduit portions are disposed in planes forming angles with the plane of the preceding curved conduit portion. This results in a more compact apparatus and the manifold system is simplified. Further, the positioning of the curved conduit portions at angles with respect to one another results in turbulence in the fluid each time the fluid flows out of a curved conduit portion into the next straight conduit portion, thus keeping the entrained material in better suspension for classification. Preferably, the apparatus is so arranged that the straight portions are disposed in vertical planes.

Figure 3:
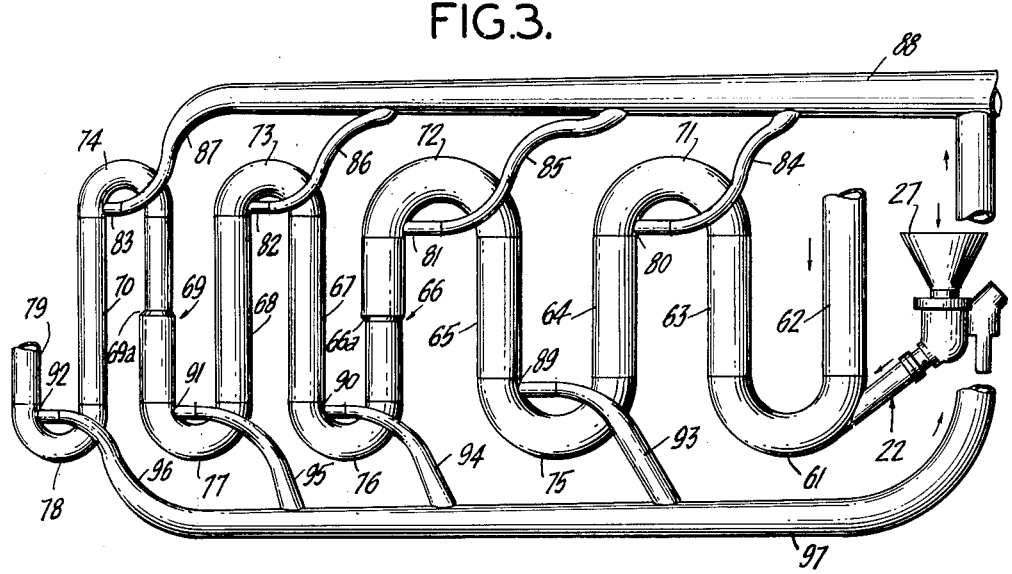
Figure 3 is a side view of another form of classifying apparatus.
Figure 4:
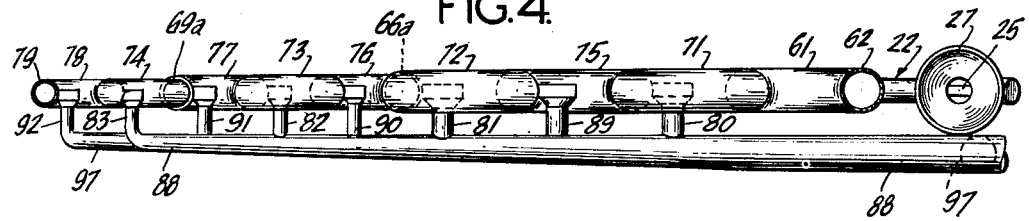
Figure 4 is a plan view of the apparatus of Figure 3.

Referring to Figures 3 and 4, a modified form of classifier is shown wherein all of the curved and straight sections are contained substantially in a single vertical plane. The classifier includes an input in the form of a curved conduit portion 61 into which the fluids and material may be introduced in a manner substantially the same as described above with reference to Figures 1 and 2, and includes an injection conduit 22 and a conduit 62.

The system includes a series of straight conduit portions 63, 64, 65, 66, 67, 68, 69 and 70 joined by a series of upper curved conduit portions 71, 72, 73 and 74, and a series of lower curved conduit portions 75, 76, 77 and 78, the latter discharging into an exhaust conduit 79, or, alternatively, into additional classifying conduits.

Formed in each of the upper curved conduits 71, 72, 73, and 74, near the downstream ends thereof are a series of outlets 80, 81, 82 and 83, respectively, joined by ducts 84, 85, 86 and 87, to a discharge or exhaust manifold 88 to discharge into a common accumulating chamber.

Formed in the lower curved conduit portions 75, 76, 77 and 78, near the downstream ends thereof, are outlets 89, 90, 91 and 92, respectively, connected by means of ducts 93, 94, 95 and 96 to an exhaust or discharge manifold 97, which may be joined to the manifold 88.

The straight conduit portions 66 and 69 are formed with reducing sections 66a and 69a, respectively, for stepping down the cross-sectional area thereof in the direction of fluid flow. After any given step-down section, all subsequent conduit portions are of correspondingly decreased cross-sectional area. The outlets 82, 83, 90, 91 and 92 are correspondingly decreased in area following the step-down sections.

If preferred, the decrease in cross-sectional area of the successive conduit portions may be made to occur gradually and progressively throughout both the curved and straight conduit portions or in selected portions, with a corresponding diminution of area in the successive outlets in the event uniform classification is desired.

Figure 5:
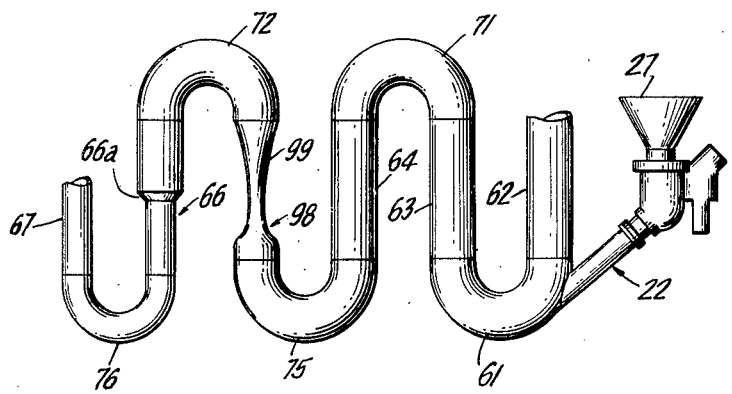
Figure 5 is a side view of a portion of still another form of classifying apparatus.

Referring to Figure 5, a modification in the classifying apparatus is shown which may be applied to any of the disclosed forms of the invention. In Figure 5, for purposes of illustration, a part of the apparatus of Figure 3 is reproduced, using like reference numerals to identify like components. In place of the straight conduit portion 65, however, there is substituted a venturi 98, having its discharge end 99 facing in the direction of fluid flow. The purpose of the venturi is to assist the entrained material to regain velocity with respect to the fluid after both have passed through several curved and straight conduit portions of uniform cross-sectional area. Preferably, the venturi is positioned immediately preceding a step-down point such, for example, as the constriction 66a.

Another embodiment of the invention is illustrated by Figure 6, wherein the apparatus is arranged to derive three or more end products of classification at the same time. In this figure part of the apparatus of Figure 3 is duplicated and identified by like reference numerals. The apparatus differs, however, in that the upper ducts 84 and 85 are connected to an exhaust manifold or header 100, and the lower ducts 93 and 94 to an exhaust manifold or header 101, which may join the manifold 100 to discharge into a first accumulating chamber (not shown). The curved conduit portions 73 and 77 are formed with enlarged outlets 102 and 103, respectively, connected by means of ducts 104 and 105 to a second exhaust manifold or header 106 adapted to discharge into a second accumulating chamber (not shown). Additional conduit portions and outlets may be provided to afford additional end products.

The material collected through the first exhaust manifold 100 will constitute the finest fraction of the entire product. Continuing further through the apparatus, material will be collected through the manifold 106, constituting a coarser fraction of the product, and from the conduit 69 a still coarser fraction will be obtained. Although the size of the particles accumulated will be greater in the latter outlets, they will, nevertheless, be sharply classified as to size. It will be understood that the arrangement of Figure 6 may be applied to any of the embodiments of the invention disclosed herein.

Figure 7:
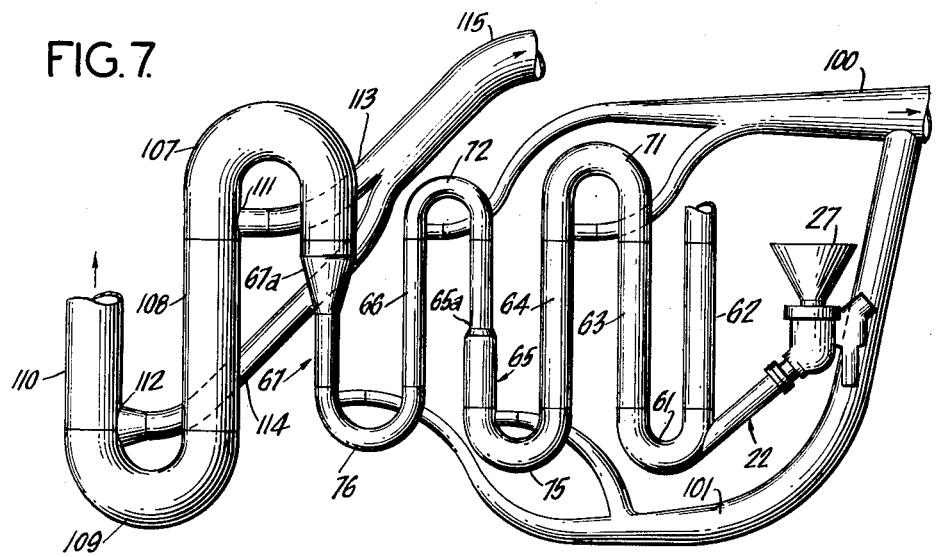
Figure 7 is a side view of a classifying apparatus comprising a modification of that disclosed in Figure 6.

Referring to Figure 7, an embodiment of the invention is illustrated which is adapted, similarly to that of Figure 6, to derive three or more products of the classification at the same time. In the embodiment of Figure 7 a portion of the apparatus of Figure 6 is substantially duplicated and identified by means of like reference numerals.

The straight conduit portion 67, however, is formed with an expanding cross-sectional area by means of a flared portion 67a and all subsequent curved and straight conduit portions 107, 108, 109, 110, etc. are of correspondingly enlarged cross-sectional area. Outlets 111 and 112 are formed at the downstream side of the curved conduit portions 107 and 109, respectively, which are of correspondingly enlarged area, and ducts 113 and 114 connect the outlets 111 and 112, respectively, to an exhaust manifold or header 115 which discharges into an accumulating chamber (not shown). The material accumulated by means of the manifold 115 will constitute a coarser fraction of the material but will nevertheless be sharply classified as to size. The balance of the material discharged through the conduit portion 110 may be accumulated and will constitute a still coarser fraction of the classification.

Figure 8:
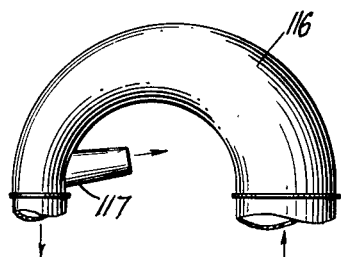
Figure 8 is a side view of a form of curved conduit which may be utilized in the practice of the present invention.

Referring to Figure 8, a design for a curved conduit portion 116 is shown adaptable for use in any of the disclosed embodiments of the invention and wherein the cross-sectional area decreases sharply and progressively in the direction of flow of fluid and entrained material. As the cross-sectional area decreases, velocity of the fluid increases, resulting in an increase in the velocity of the entrained material in the vicinity of its outlet 117. Particles of larger mass are carried past the outlet at a higher velocity than would have been available in the event the cross-sectional area of the conduit portion 116 were maintained constant. Particles of lesser mass are entrained in the fluid escaping from the outlet 117 and become part of the fines collected from the classifier. Thus the design of the curved conduit portion may be adjusted to increase the sharpness of classification. Guide vanes as described below may be used in the outlet 117.

Figure 9:
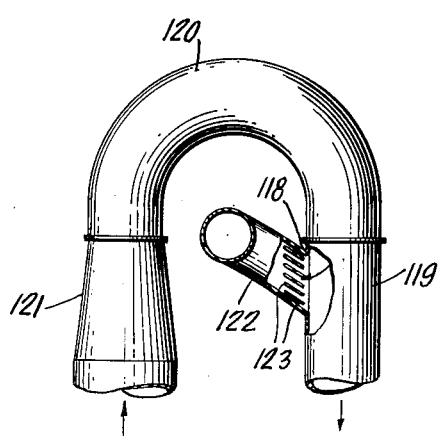
Figure 9 is a side view of one type of outlet which may be used in conjunction with classifying apparatus.
Figure 10:
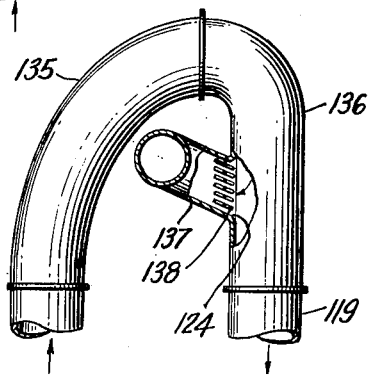
Figure 10 is a side view of another type of outlet.

Referring to Figures 9 and 10, details of outlet constructions adapted to be used with apparatus formed in accordance with the invention, are shown. In Figure 9, an outlet 118 is disposed in a straight conduit portion 119 connected to the downstream side of a curved conduit portion 120, the input of which may comprise a straight portion 121 of diminishing cross-sectional area. Fitted in the outlet 118 is an outlet duct 122, having angularly movable vanes 123. The vanes 123 may be used to assist in the classification. When angled in the direction of flow in the conduit 119 as shown in Figure 9 the separated particle size of the exhaust product will be smaller and, when angled to oppose the direction of flow, the separated particle size will be larger.

In Figure 10 is shown an arrangement wherein an outlet 124 is disposed along the inner surface of the discharge end of an irregularly curved length of conduit which may include a first curved portion 135 having a relatively generous radius of curvature connected to a second conduit portion 136 having a substantially sharp right angle elbow at its upper or input end and a relatively straight portion at its discharge end and in which the outlet 124 may be disposed. The outlet 124 may communicate with a discharge duct 137 fitted, if desired, with suitable adjustable vanes 138. In the arrangement of Figure 10 the outlet 124 is disposed close to the point at which the full 180 degree change of flow direction occurs, the outlet being alongside the curving conduit portion 135.

Referring to Figures 11 through 14, inclusive, there are shown representative contours for the conduit portions of which classifying apparatus may be formed in accordance with the present invention. It will be understood that in any given apparatus more than one form of cross-sectional area may be used in the several conduit portions.

Referring to Figure 15, a graph is shown which illustrates a series of velocity profiles of the fluid at spaced apart points in straight and curved conduit portions of a part of a classifying apparatus formed in accordance with the invention. In this figure the conduit portions are shown in phantom lines, and the several lines on which the several velocity profile curves are taken are identified by the letters $a, b, c \ldots i$ and $j$. For convenience the curve taken on the line $f$ is shown by the separate Figure 15a.

In each velocity profile curve the base line or abscissa represents the diameter of the conduit and the ordinate the fluid velocity. The curve of maximum velocity throughout the illustrated portion of the system is identified by the numeral 125, and the curve of minimum velocity by means of the curve 126.

It will be seen that the curve of maximum velocity passes along the outer surface of the first conduit portion (at the left hand side of Figure 15), passes close to the inner periphery of the curved conduit portion and across the outlet 127, and then passes along the outer surface of the second straight conduit portion. Because the finer the entrained material is, the more nearly it tends to follow the flow of the fluid, the larger particles having sufficient mass will be carried past the outlet 127. Smaller particles of less mass are, on the contrary, entrained in the fluid escaping from the outlet and are conveyed out of the apparatus to constitute the product of fine particle size. By controlling the size, shape and position of the outlet near the inner periphery of the curved conduit portion in relation to the velocity of the fluid passing through the curved conduit portion, very sharp classification may be obtained.

In Figure 16 there is shown a composite graph of static pressure profiles which occur at spaced points throughout the length of a part of a classifying apparatus including a pair of straight conduit portions and a curved conduit portion, all shown in phantom lines. Also shown in phantom lines is the injection conduit 22 having its discharge end 24 disposed in the curved conduit portion at a precise location described more fully below. The curves representing static pressure profiles are taken on the lines identified by the letters $a, b, c \ldots j$ and $k$, and in each curve the base line or abscissa represents the diameter of the conduit and the ordinate the static pressure. Plotted about the outer surface of the conduit portions is a curve 133 representing pressures along the periphery of the apparatus and plotted about the inner surfaces of the conduit portions is a curve 134 representing pressures along the inner periphery.

Referring to the pressure curves 133 and 134, it will be seen that an area of minimum pressure and hence an optimum area for the introduction of the fluid and entrained material into the apparatus occurs in the curved conduit portion near its inner surface. The discharge end 24 of the injection conduit 22 is located in this area. The injection of material fed into the apparatus in this area requires a minimum back pressure.

In a representative embodiment of the invention, for example, a pressure of about five pounds per square inch behind the conduit 22 was required to introduce the material into the apparatus. In comparison, a pressure several times higher was required to introduce the material into the apparatus near the outer periphery of the curved conduit portion. Thus in accordance with the invention, a saving in the size and capacity of the input blowers may be effected.

In operation uniform classification of material is obtained by the decrease, preferably gradual in nature, in cross-sectional area of the conduits and the corresponding proportional decrease in the area of the outlets, which arrangement maintains the fluid and entrained material at substantially the same velocity throughout its passage through the curved and straight conduit portions and, proportionately, the velocity through the various outlets is respectively and substantially the same for each outlet as compared to each of the other outlets.

It will be seen that the location of the area of minimum static pressure is spaced downstream of the outlet end 24 of the injection conduit 22 and also that the inner curved wall of that conduit portion, where pressures are at a minimum, is laterally spaced from the outlet end 24 a distance slightly less than one-half of the conduit diameter. Noting that in the illustrated embodiment of the invention the curved conduit portion curves through an angle of 180°, it has been found that this location for the point of injection of the material to be classified makes use of the curving flow path within the curved conduit portion to bring about effective suspension of the solid material in the fluid. Of course, if the problem of suspension is not critical, injection might be effected at the area of absolute minimum pressure.

The straight conduit portions following each curved conduit portion act to change the velocity and pressure distribution and the pattern of flow of the fluid, the tendency being to straighten out the flow of fluid and entrained material as they approach the next curved portion, thus better organizing the fluid and material to enter the curved portion to achieve better classification at the outlet. Of course the length of the straight conduit portions may be varied, and if desired a series of straight and curved conduit portions may be interposed before a curved portion having an outlet is encountered. The latter arrangement is of particular value when the apparatus is used for the treatment of materials prior to classification as when time for surface coating of materials and chemical reactions between materials is needed.

Also, depending upon the types of materials introduced into the system a certain reduction in particle size due to grinding may result, although operation of the system without recirculation as used in grinding mills tends to minimize this effect. The disclosed systems are of course adapted to operate under a wide range of velocities and pressures, with minimum velocities and pressures being most suitable in cases where low cost operation without a decrease in efficiency is required.

From the foregoing description of several preferred embodiments of the invention it will be understood that great flexibility of operation is achieved. It will also be understood that the control of particle size by classification is obtained by balancing the number of variables such as size, shape, position and adjustability of outlets, the back pressure on the outlets, the proportion of fluid to solid material, the velocity of the fluid, the cross-sectional area of the conduits, and the temperature of the fluid.

The particular forms of the invention described and illustrated in the accompanying drawings are presented as examples of how the invention may be applied. Moreover, it is to be understood that the phraseology and terminology employed is used for purposes of description and not limitation. Other forms, embodiments and applications of the invention coming within the proper scope of the appended claims will readily suggest themselves to those skilled in the art.

We claim:

1. In apparatus for classifying, at least first and second curved conduit portions for accommodating fluid flow, each of said curved conduit portions having input and output ends, means to connect the output end of the first conduit portion to the input end of the second conduit portion, means to introduce fluid and particles of solid material to be entrained thereby into the first conduit portion to pass from the outlet end thereof, classifying outlet means formed near the inner periphery of the second curved conduit portion at a location spaced from its input end for receiving part of the fluid and entrained material which passes through the second curved conduit portion, and means connected to the outlet end of the second curved conduit portion to accommodate the remaining fluid and particles which pass the classifying outlet means and to direct them away from the first conduit portion to define an open ended system in which the fluid comes into proximity with the outlet means but once.

2. Apparatus as set forth in claim 1, including adjustable means to control the flow through the outlet means.

3. In apparatus for classifying, means including a plurality of each straight and curved conduit portions connected in series for accommodating fluid flow, each of said curved conduit portions having input and output ends, means to introduce fluid and particles of solid material to be entrained thereby into the series of conduit portions to pass therethrough, a plurality of classifying outlet means formed respectively near the inner peripheries of and at locations spaced from the respective input ends of at least certain of said plurality of curved conduit portions for receiving part of the fluid and entrained material, and means to accommodate the remaining fluid and particles passing from the outlet end of the last conduit portion of the series, whereby the fluid passes through the apparatus but once.

4. Apparatus as set forth in claim 3, said conduit portions between the input and output ends of the apparatus undergoing a change in cross-sectional area.

5. Apparatus as set forth in claim 3, said plurality of outlet means being disposed near the inner peripheries of the respective curved conduit portions and also being respectively constructed and arranged to receive different quantities of fluid and entrained material.

6. Apparatus as set forth in claim 5, the cross-sectional areas of the respective conduit portions changing between ends of the apparatus as a function of the ability of respective outlet means to receive fluid and entrained material.

7. Apparatus as set forth in claim 6, including a constricting section in at least one of the straight conduit portions for effecting the change in cross-sectional area.

8. Apparatus as set forth in claim 7, including a venturi disposed upstream of said constricting section.

9. In apparatus for classifying, a plurality of each curved conduit portions and straight conduit portions connected in series, each curved conduit portion having an input and an output end, said straight and curved conduit portions defining a sequence of curved and straight flow paths by means of which material is passed through the apparatus but once, means to introduce fluid and particles of solid material to be entrained thereby into one end of the apparatus, said conduit portions being constructed and arranged to afford decreasing cross-sectional areas progressing through the apparatus in the direction of fluid flow, and a plurality of classifying outlet means disposed respectively near the inner peripheries of respective curved conduit portions between ends of the apparatus and disposed at locations spaced respectively from the input ends, said classifying outlet means being constructed and arranged to receive fluid and entrained material in quantities which are directly proportional to the cross-sectional area of corresponding conduit portions.

10. In apparatus for classifying, at least first and second curved conduit portions for accommodating fluid flow and disposed respectively in planes forming an angle with each other, means to introduce fluid and particles of solid material into the first curved conduit portion, classifying outlet means near the inner periphery of the second curved conduit portion and adjacent its output end, means connecting the first and second curved conduit portions in series and means connected to the second curved conduit portion to accommodate the remaining fluid particles which pass the classifying outlet means and to direct them away from the first conduit portion to define an open ended system in which the fluid comes into proximity with said outlet means but once.

11. Apparatus as set forth in claim 10, the first and second conduit portions being contained in substantially vertical planes forming substantially right angles with each other.

12. Apparatus as set forth in claim 10, said conduit means connecting the first and second curved conduit portions including a plurality of each curved and straight conduit portions connected in series, with successive curved conduit portions being contained in planes forming an angle with the plane of the preceding conduit portion.

13. In a method of classifying the steps of establishing a flow of fluid in a stream, establishing a pressure gradient across the stream by causing the stream to follow a curved path, introducing material into the stream near the area of minimum pressure of the gradient and in a direction parallel to the flow of the stream to be entrained by the stream, causing the stream to flow through a succession of straight and curved flow paths, changing the cross-sectional area of the stream after at least certain of the points of withdrawal, thereby to control the velocity of the stream, and withstanding fluid at successive curves in the flow stream in quantities which are a function of the cross-sectional areas of corresponding sections of the stream.

References Cited in the file of this patent

UNITED STATES PATENTS

| | | |
|---|---|---|
| 650,800 | Smith et al. | May 29, 1900 |
| 821,819 | Neumann | May 26, 1906 |
| 1,269,704 | Haddock | June 18, 1918 |
| 2,325,080 | Stephanoff | July 27, 1943 |
| 2,361,758 | De Fligue | Oct. 31, 1944 |
| 2,590,219 | Stephanoff | Mar. 25, 1952 |

FOREIGN PATENTS

| | | |
|---|---|---|
| 110,914 | Sweden | June 20, 1944 |